United States Patent [19]
Jackman

[11] 3,978,572
[45] Sept. 7, 1976

[54] PIPE JOINT MAKE UP TOOL

[75] Inventor: Robert M. Jackman, Little Rock, Ark.

[73] Assignee: A. O. Smith-Inland, Inc., Milwaukee, Wis.

[22] Filed: Oct. 10, 1975

[21] Appl. No.: 621,412

[52] U.S. Cl. .............................................. 29/237
[51] Int. Cl.² ........................................ B23P 19/04
[58] Field of Search.............. 29/237, 282; 254/29 R

[56] References Cited
UNITED STATES PATENTS
870,931  11/1907  Claiborne ............................ 29/237

*Primary Examiner*—Al Lawrence Smith
*Assistant Examiner*—Roscoe V. Parker
*Attorney, Agent, or Firm*—Andrus, Sceales, Starke & Sawall

[57] ABSTRACT

A pipe joint make up tool for joining pipe members together including pipes and fittings and caps in which gripper half collars having a tapered rail along each facing edge are placed around a pipe and wedging clamps having complementary flanges are thereby engaged with the rails of the collars on opposite sides of the pipe. Each collar has an internal gripping surface of flexible material. The gripper collars are each provided with a hydraulic cylinder connected to a common hand pump or to other power means. Cables or chains are located diametrically opposite each other and connected to the piston of each hydraulic cylinder on the first pipe and to wedging clamps assembled on the gripper half collar disposed around the second pipe. As force is applied by the hydraulic cylinders the wedging action as the pipes are pulled together sockets one pipe into the other at the joint between them. A gauge in the hydraulic system is used as a force indicator.

9 Claims, 13 Drawing Figures

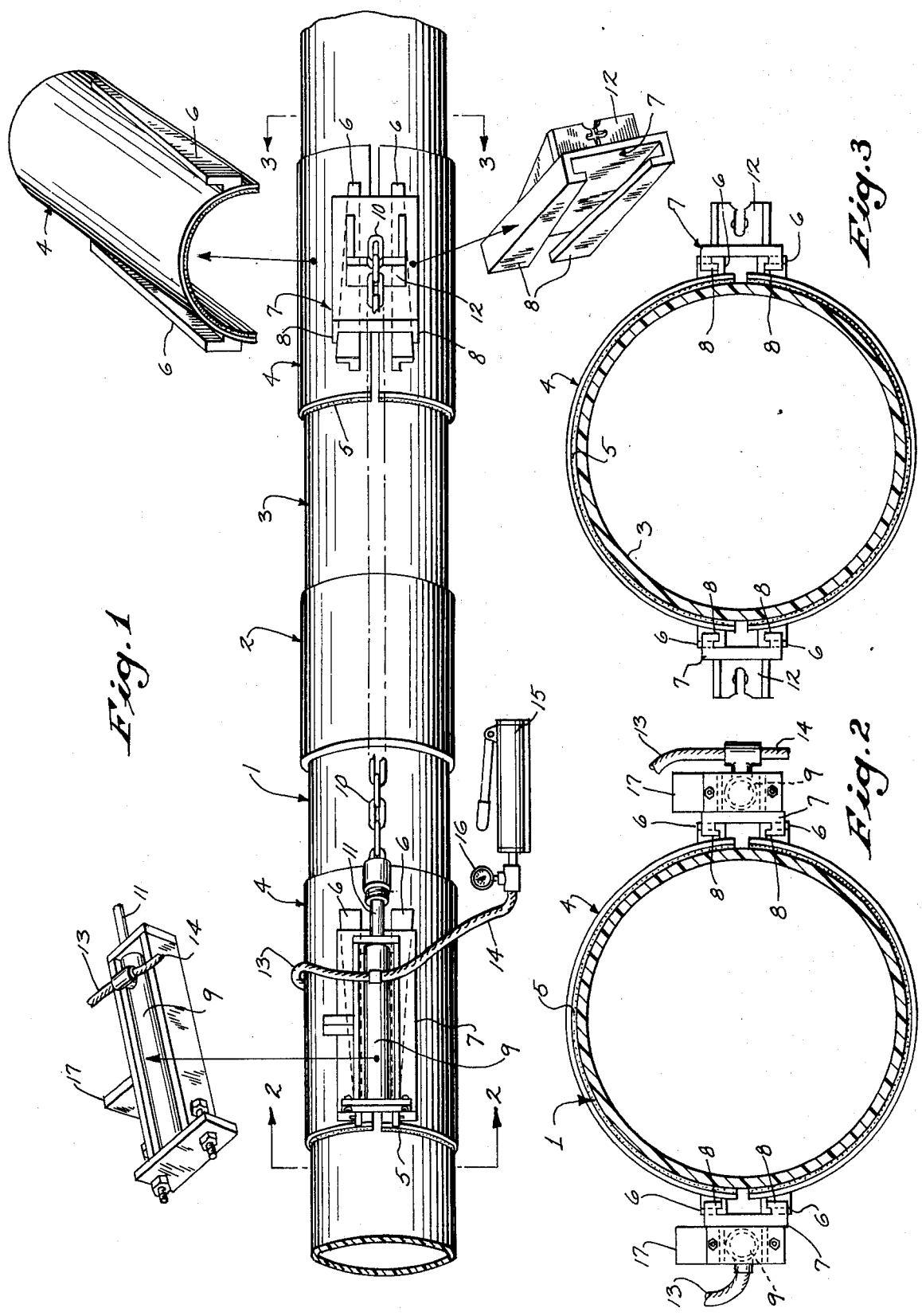

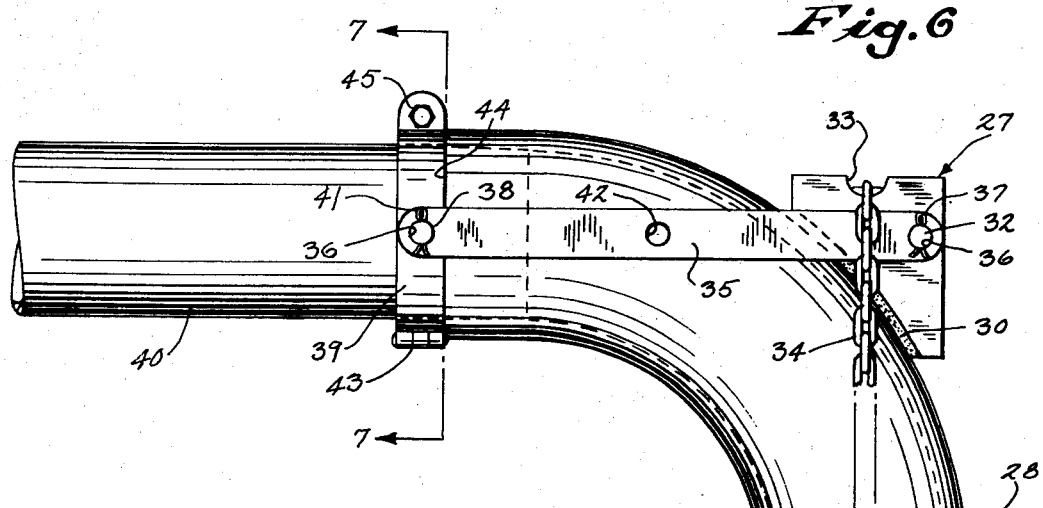
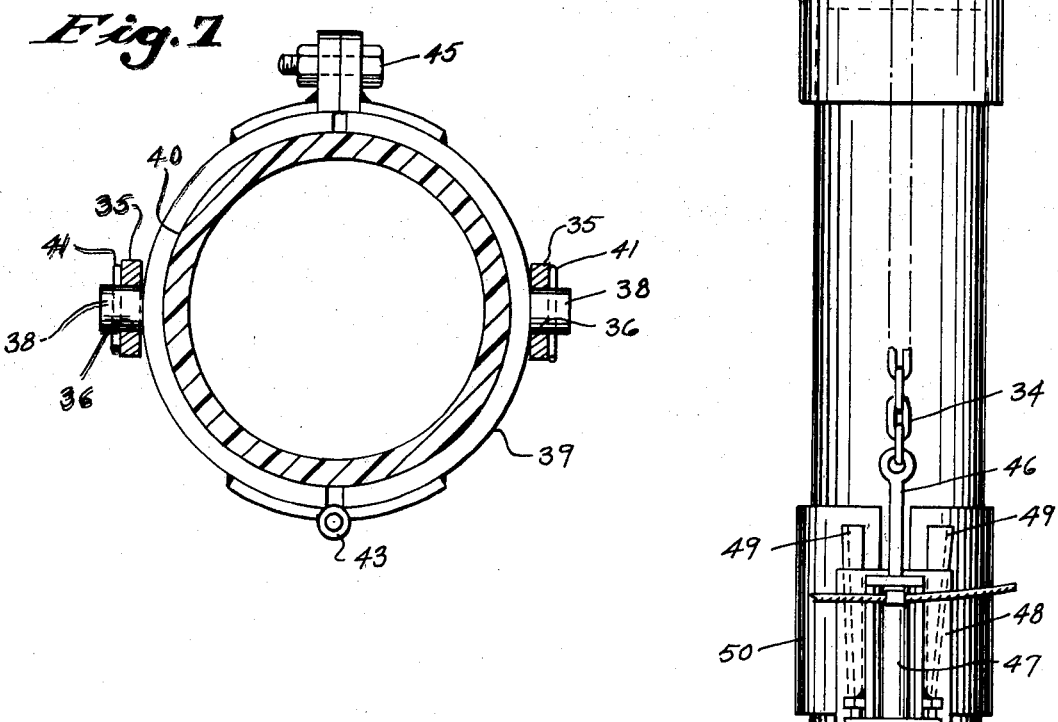
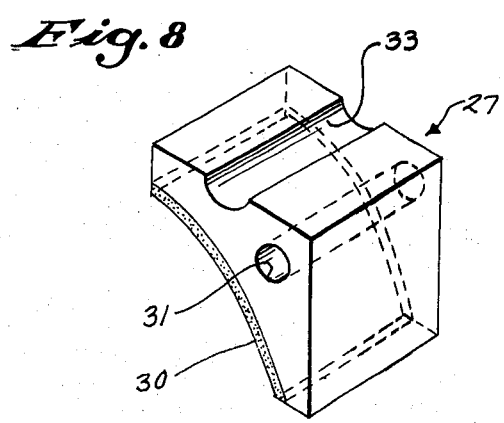

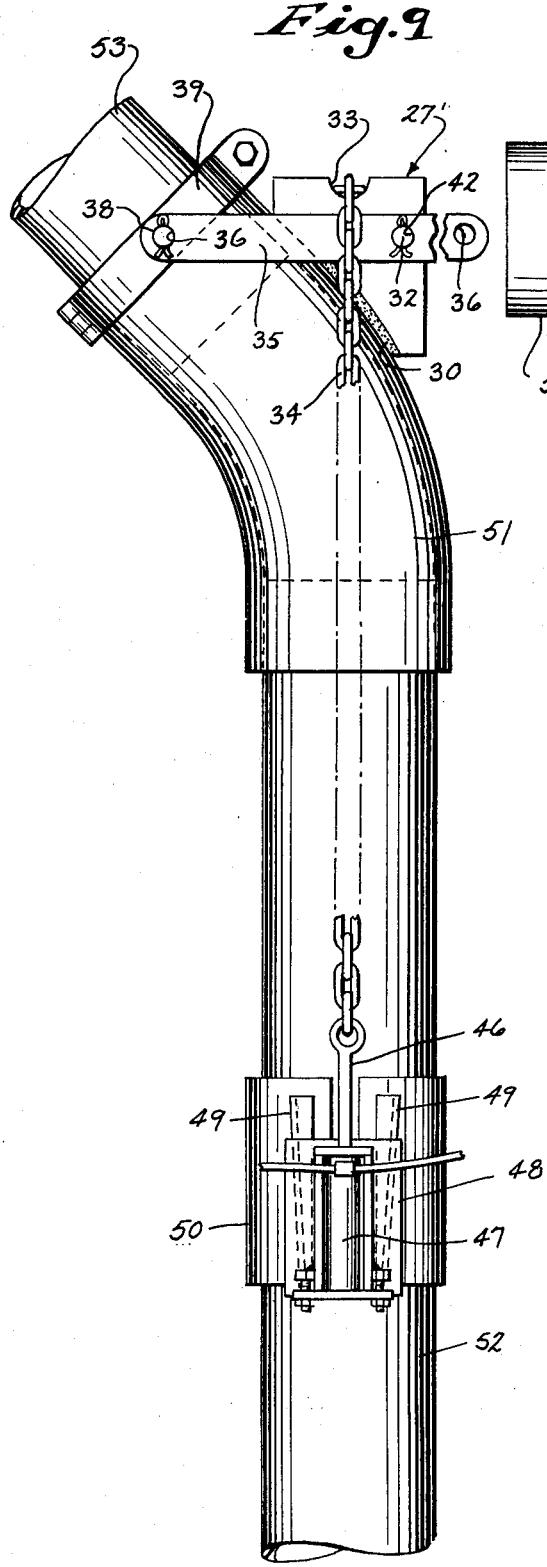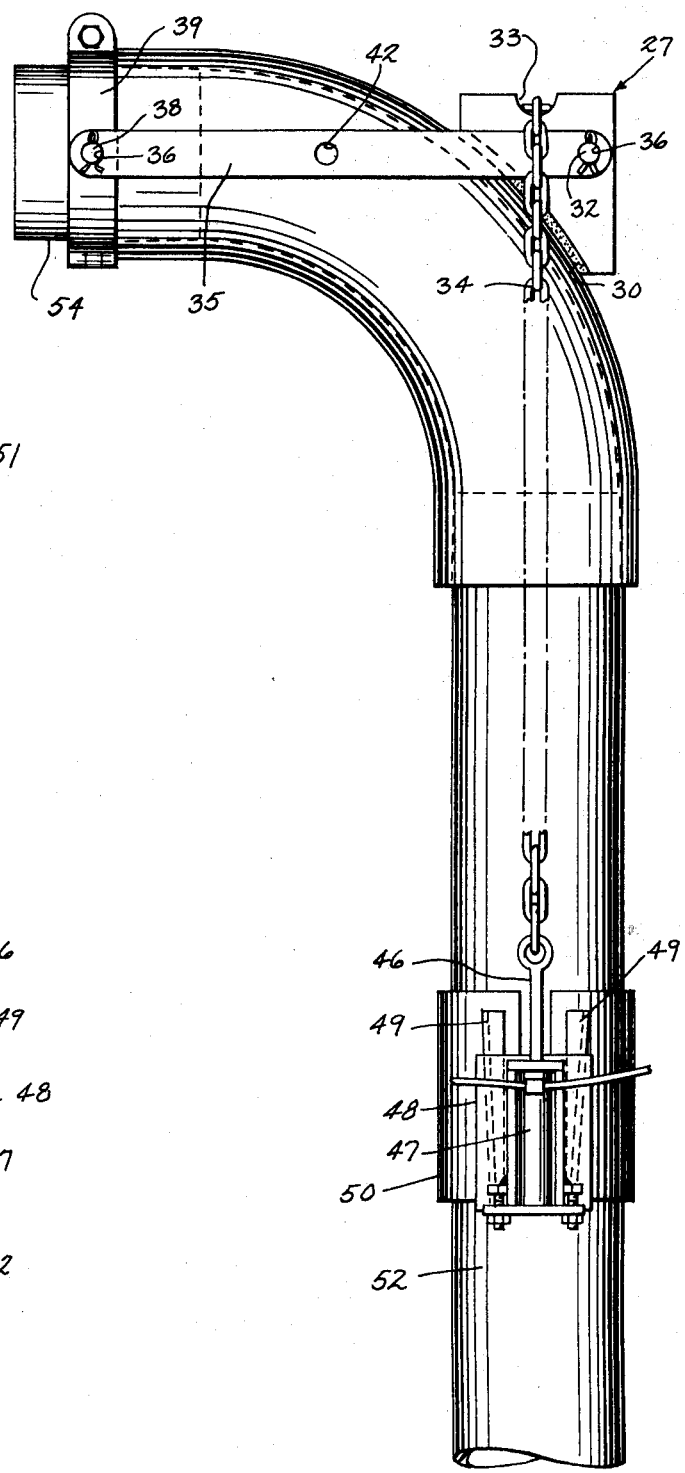

PIPE JOINT MAKE UP TOOL

BACKGROUND OF THE INVENTION

Adhesive bonded pipe joints are commonly used with many types of plastic pipes. The best joints are formed when the adhesive is in the form of a thin uniform line. To achieve this, a tapered bell and spigot type joint is most commonly used. However, it is necessary that the joints be socketed together with considerable force to prevent slipping and cocking of the pipes at the joint and a subsequent weak bond which will fail. Small diameter pipes can be joined and locked together by hand with two or more men thrusting the spigot into the bell with force. Larger diameter pipes are more difficult to join because of their size, weight, large bond area and a thicker, less resilient pipe wall. The usual methods are to hammer the spigots home into the bell by pounding on the opposite end of the pipe or to loop a chain or rope hitches around each pipe, then connect these with a ratchet type come-along or puller and pull the pipes together. Other devices offered on the market grip the pipe and are connected by a rod or beam and force is applied by a rack and gear arrangement.

Hammering on the pipe does not apply sufficient force. Mechanical come-along devices do not apply a balanced force on each side of the pipe members to be joined and parallel to the axis of the pipe member. No force indicators have been used to constantly give reliable joints without risk of excessive force that can cause damage.

The invention overcomes the problems of the prior art by employing a wedging construction located on diametrically opposite sides of pipe to socket the pipes together at a joint area by the use of hydraulic cylinders and a force indicator to prevent excessive force being applied to the pipes.

SUMMARY OF THE INVENTION

The invention has several embodiments. In the first embodiment two elongated pipes are joined together at a joint area with one pipe at the area being of bell construction and the other of spigot construction to fit within the bell end of the bell formed pipe. In this embodiment each pipe is encircled by a gripper split collar and the facing edges of the collars have rails which are tapered so the rails gradually increase in height as they extend towards the adjacent pipe. The inner surfaces of the collars are provided with a material suitable for gripping each pipe, such as rubber. Wedging clamps which have flanges formed complementary to the rails of the gripper collars are assembled on the rails of the gripper collar. A hydraulic cylinder is connected to the wedging clamp on each side of one of the pipes in diametrically opposed position. Chains or cables or like pulling members are connected to the pistons of each hydraulic cylinder on both sides of the pipe and to the wedging clamps on both sides of the other pipe. The hydraulic cylinders are then actuated and as the force is increased by inward movement of the pistons, the wedging action develops a firm grip of the collars on each pipe and the pipe with the spigot end is pulled into the bell end of the other pipe to form a tight joint within which adhesive material has previously been deposited. A gauge is employed in the hydraulic system to indicate and thereby control the force which is being applied.

Under a second embodiment pipe members such as elbows of 45° and 90° are secured to a length of pipe. Under one construction the elbow is provided with an anchor lug around which extends a chain or cable which at the free ends is secured to the pistons of hydraulic cylinders located on each side of the pipe and secured to wedges which have flanges complementary to the tapered rails of a split gripper collar which engages the pipe and grips the same. When the wedging action is increased by actuation of the pistons on each side of the pipe, the elbow fitting is pulled over the end of the pipe to form a tight joint within which adhesive material has been previously located.

Under the third embodiment of the invention it may be desirable not to use the anchor lug and instead replace it with a reusable anchor lug for making the joint. In such a case, the elbow which may either be of 45° or 90°, for example, the pipe to be joined is buttered with a lubricating adhesive and inserted into one end of the elbow. In this embodiment it is assumed that a pipe has already been joined to the other end of the elbow. A split collar is then assembled over the initially bonded pipe and abuts the end of the fitting. Bars are secured on opposite sides of the clamp and extend on either side of the elbow and are connected to a reusable anchor which has a rubber pad or the like on the inside in contoured engagement with the somewhat semicircular outer surface of the elbow fitting. A chain or cable is passed around a notch in the reusable anchor and the free ends of the chain are secured to pistons of hydraulic cylinders located on each side of the pipe which is to be joined to the elbow fitting. The cylinders are in turn secured to wedges which have flanges complementary to tapered rails on a split gripper collar which engages the pipe and grips the same with an inner gripping surface as of rubber. When the wedging action is increased by actuation of the pistons on each side of the pipe the elbow fitting is pulled over the end of the pipe to form a tight joint within which adhesive material has been previously located.

In the event that a pipe has not been first bonded to one end of the fitting over which the split clamp may be assembled to abut against the fitting, a removable short pipe nipple is inserted in the end of the elbow fitting and the clamp is then located over the pipe nipple to hold the clamp in abutting relation to the elbow. The joining of the pipe and elbow is accomplished as described as in the case where a first pipe has already been bonded to the fitting which receives the clamp.

In all the described embodiments a gauge is preferably employed in the hydraulic system to record the force applied to make the joint.

Under the fourth embodiment of the invention the construction of the invention may be used to anchor an end cap on a pipe. In this case two threaded rods are anchored in an upstanding projection in each of the wedge members which are assembled on the tapered rails of the split gripper collar which has previously been assembled on the pipe. The rods extend on opposite sides of the pipe and end cap and through a channel iron which extends from each rod across the back of the end cap. Nuts are threaded onto the ends of the rods and into engagement with the channel iron and when tightened tend to pull the wedges toward the end cap and thereby tightly secure the end cap on the end of the pipe as these members are pulled together by the action of the wedges on the gripper collars.

DESCRIPTION OF THE DRAWING FIGURES

The drawings furnished herewith illustrate the best mode of the invention presently contemplated by the inventor and disclose the above advantages and features as well as others which will be understood from the detailed description thereof.

In the drawings:

FIG. 1 is a side plan view of the pipe joint make up tool in position to join two pipe ends together with an exploded view of the hydraulic cylinder and the gripping and wedge members at the opposite ends of the pipes;

FIG. 2 is a section taken on line 2—2 of FIG. 1;

FIG. 3 is a section taken on line 3—3 of FIG. 1;

FIG. 6 is a side elevational view of the joining of a 90° elbow fitting to a pipe section with a reusable anchor and with parts in elevation;

FIG. 7 is a section taken on line 7—7 of FIG. 6 to illustrate the split anchor collar;

FIG. 8 is a view of the reusable anchor or thrust block;

FIG. 9 is a side elevational view of a 45° elbow fitting joined to a pipe section with parts in section;

FIG. 10 is a side elevational view illustrating the use of a nipple to hold the anchor clamp when that end of the fitting is not yet bonded;

DESCRIPTION OF THE ILLUSTRATED EMBODIMENTS

Figure 4:
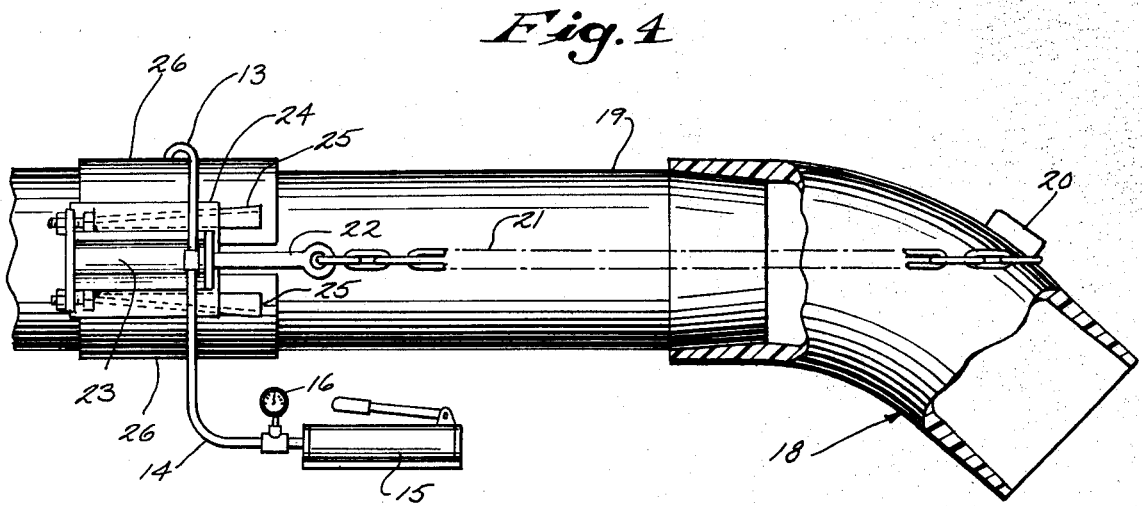
FIG. 4 is a side elevation view of the joining of a 45° elbow to a pipe section with a fixed anchor lug on the elbow and parts in section.

Referring to FIGS. 1, 2 and 3 of the drawings, there is shown a pipe section 1 having a bell shape 2 at the joint end within which is received the spigot end of pipe section 3 after the latter has been covered at the spigot end with a suitable adhesive material, not shown. Bell 2 is shown as integral with pipe 1 but the invention also includes a bell provided by a sleeve coupling and the pipe sections 1 and 3 would be spigoted and received in opposite ends of the sleeve coupling. The joint make up tool of the invention for socketing pipe sections 1 and 3 together has the split gripper collars 4 which engages each of the pipe sections 1 and 3.

Collar 4 completely encircles the respective pipes 1 and 3 adjacent the joint area except for a short space between the meeting faces of split collar 4. The inside surface of each gripper collar 4 is provided with a gripping lining 5 such as of rubber or similar material which extends over a large area of each pipe and is sufficiently flexible to accommodate surface irregularities on the pipe sections.

As illustrated in FIG. 1, the surface of each collar 4 adjacent the meeting faces contains the rails 6 which taper so that the height of rails 6 gradually increase in the extent of the rails toward the joint between pipes 1 and 3.

As also illustrated in FIG. 1, wedges 7 which are formed with flanges 8 formed complementary to rails 6 on each collar 4 also taper in extent so that as the respective wedges 7 on each pipe 1 and 3 are pulled toward each other the grip of each split gripper collar 4 is gradually increased upon the respective pipes 1 and 3 because the application of force to collars 4 by wedges 7 tightens the collars and increases the friction in proportion to the load applied.

As may be observed in FIGS. 2 and 3, the wedges 7 are located on both sides of the pipes 1 and 3 in engagement with the rails 6 of the split gripper collars 4.

The load on the wedges 7 is applied from a hydraulic cylinder 9 which is secured to a wedge 7 located on each side of one of the gripper collars 4 on one of the pipes such as pipe 1 and through a chain or cable 10 which is connected to the piston 11 of each cylinder 9 at one end to the abutment 12 on each wedge 7 in engagement with gripper collar 4 on pipe 3. The chain 10 extends on opposite sides of the respective pipe sections 1 and 3.

The hydraulic cylinders 9 located on the opposite sides of pipe 1 are connected by hoses 13 and 14 to hand pump 15 for actuating the respective cylinders. In order to ascertain the pressure applied to join the pipe, a pressure gauge 16 is located in common hose line 14 so that a desired pressure can be obtained and thereby prevent collapse of the spigot or other damage to the joint.

The wedges 7 and hydraulic cylinder 9 are initially assembled on the gripper rails 6 of collar 4 and then lightly tapped with a hammer to snug collar 4 against the pipe. The chain 10 is connected to each piston 11 which are initially in an extended position on either side of pipe 1 and to each abutment 12 on the wedges 7 on each side of pipe 3. Operation of hand pump 15 actuates pistons 11 to withdraw them and thereby tighten chain 10 and draw wedges 4 on each pipe toward each other to socket pipes 1 and 3 together. The lugs 17 may be disposed on the cylinders 9 to provide for loosening wedges 7 with a hammer when the tool is to be disassembled.

Two eight inch diameter pipes approximately eight feet long each with a bell and spigot where joined using the described gripper collars 4 and wedges 7. The bonding surfaces at the joint were initially buttered with uncatalyzed adhesive to provide lubricated surfaces. The cylinders 9 were pressurized to 3,000 lbs. gauge pressure with the hand pump 15 thereby providing a calculated force of 3,300 lbs. ramming the joint together. After removal of the make up tool, an attempt was made to move or unlock the joint by bending over a plank and striking the joint area with a rubber mallet. The joint could not be moved or slipped, and was finally pulled free by applying a large mechanical force. The pipes were not damaged.

Figure 5:
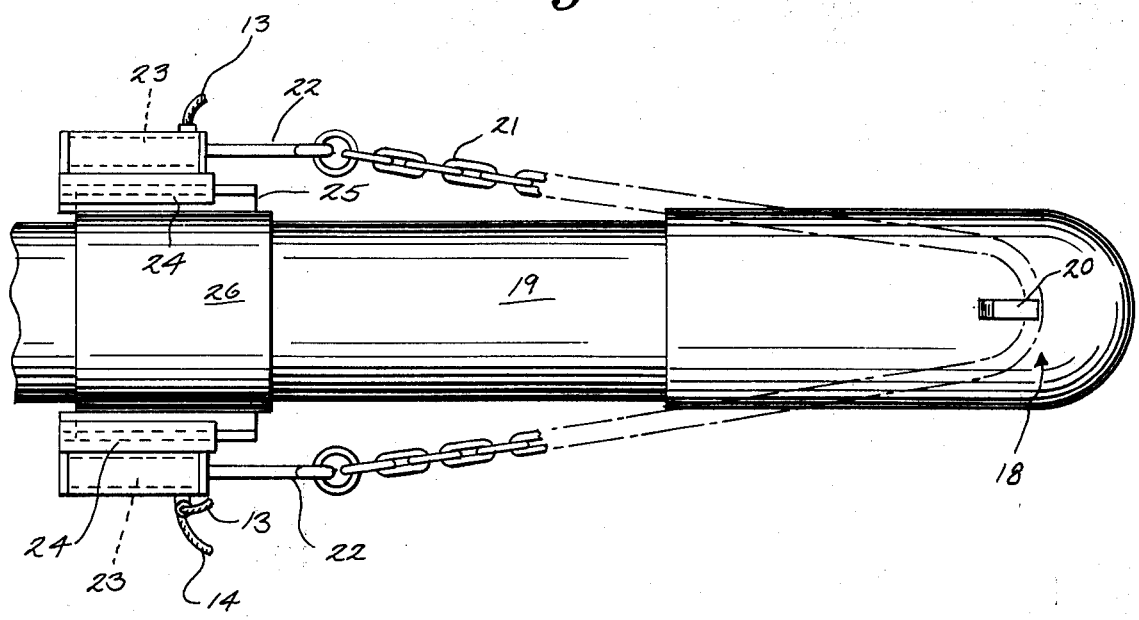
FIG. 5 is a top elevational view of FIG. 4.

FIGS. 4 and 5 illustrate the application of the make up tool to assembling the pipe member or elbow fitting 18 to the pipe 19, with the pipe fitting within the end of fitting 18. In this embodiment the anchor 20 is an integral part of fitting 18 and a chain or cable 21 extends around the anchor and on both sides of fitting 18 and pipe 19. The free ends of the chain 21 are then secured to the pistons 22 of hydraulic cylinders 23 which are secured diametrically opposite each other on pipe 1 to wedges 24 which engage rails 25 of the split gripper collar 26 as in the first embodiment. Only one side of the make up tool construction is shown in FIG. 4, but the other side is the same, and FIG. 5 illustrates the chain 21 and anchor 20 as the chain extends around anchor 20.

As in the previous embodiment the joint surfaces are coated with a bonding adhesive, not shown, before assembly of the fitting and pipe which initially acts as a lubricant and each hydraulic cylinder 23 is actuated as in the previous embodiment by a hand pump 15 with a pressure gauge 16 being disposed in the common hose line 14 connected to hose line 13 and to pump 15 so that the pressure applied can be accurately gauged.

FIGS. 6–8 illustrate the use of a reusable anchor 27 to join the 90° fitting or pipe member 28 to the pipe 29 with the pipe 29 extending within the end of the fitting and previously having been coated with an adhesive bonding material which acts as a lubricant initially in aiding to socket the fitting 28 and pipe 29 together.

In this embodiment the achor 27 has a lining 30 of gripper material such as rubber secured to the inside of the anchor 27 and shaped so as to match the contour of fitting 28.

The reusable anchor or thrust block 27 as illustrated in FIG. 6 and FIG. 8 has a hole 31 extending through the fitting to receive a cross shaft 32 and a notch 33 in the upper end to receive a chain or cable 34.

The tie bars 35 having holes 36 at opposite ends, at one end fit over shaft 32 which projects through anchor 27 and are held thereto by pins 37. At the other end of the bars 35 holes 36 permit the bars to be assembled over the stubs 38 which are located on opposite sides of the split clamp 39 disposed around pipe 40 which has previously been assembled with fitting 28. Pins 41 secure bars 35 onto stubs 38. Each tie bar 35 also has a hole 42 generally centrally thereof for use with a 45° fitting elbow.

Split clamp 39 has a hinge 43 to enable it to be assembled around pipe 40 adjacent to the abutment 44 formed by the end of the bell shape of fitting 28. The opposite side of split clamp 39 is secured together by the bolt 45.

In order to socket fitting 28 and pipe 29 together, the chain or cable 30 has its respective free ends secured to pistons 46 of hydraulic cylinders 47 which are secured to the diametrically oppositely located wedges 48 is complementary engagement with the tapered rails 49 of split gripper collar 50 located around the pipe 29 to be assembled with fitting 28. The construction of the tool is similar to the first embodiment. The hydraulic cylinders 47 have hoses 13 and 14 connected to a hand pump 15 as in the first embodiment, and similarly a gauge 16 is assembled in line 14 so that the pressure applied to socket the pipe and fitting can be controlled.

FIG. 9 illustrates the assembly of a 45° pipe member or fitting elbow 51 to the end of pipe 52. In this embodiment the construction of the split clamp 39 is the same as that described with respect to assembling a 90° pipe member or elbow. However, the reusable anchor 27' is contoured so that its gripping surface or lining 30 matches the contour of the 45° fitting 51. The central holes 42 in the tie bars 36 permit the tie bars to be pinned to the shaft 32 projecting from the reusable anchor 27' and the opposite end of tie bars 35 are pinned to the studs 38 which are secured on opposite sides of the split clamp 39 assembled around pipe 53 and abutting against the end of elbows 51.

As in the previous embodiment the chain or cable 34 extends around notch 33 in reusable anchor 27' and its respective free ends are secured to pistons 46 of hydraulic cylinders 47 which are secured to diametrically oppositely located wedges 48 in engagement with rails 49 of split gripper collar 50 located around pipe 52 which has been buttered with adhesive and assembled with the end of fitting 51. The wedging action to join pipe 52 and elbow 51 is accomplished by actuation of the hydraulic cylinders as previously described.

In both the assembly of 45° and 90° pipe members or elbows with respect to the first pipe to be joined to the elbow, as illustrated with respect to a 90° elbow in FIG. 10, a pipe nipple 54 without any adhesive material thereon is inserted into elbow fitting 28, such as the 45° elbow by way of example, and the split clamp 39 is assembled over and abuts the end of elbow 28. With this construction pipe 29 is joined to elbow 28 by actuation of chain 34 upon the reusable anchor 27' in the same manner as illustrated in FIG. 6.

When the reusable anchors have been employed as described with respect to FIGS. 6–10, it has been found that approximately 4000 psi gauge pressure will provide a good lockup of the joints between the pipe parts although up to 5500 psi have been used without damage to the pipe members.

Figure 11:
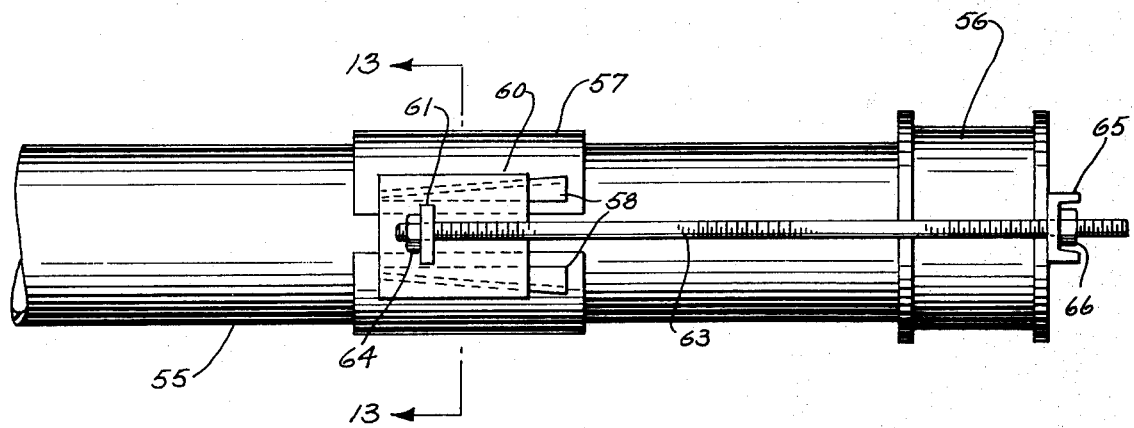
FIG. 11 is an elevational view illustrating the application of a cap to the end of the pipe as might be used in testing or closing off a pipe end.
Figure 12:
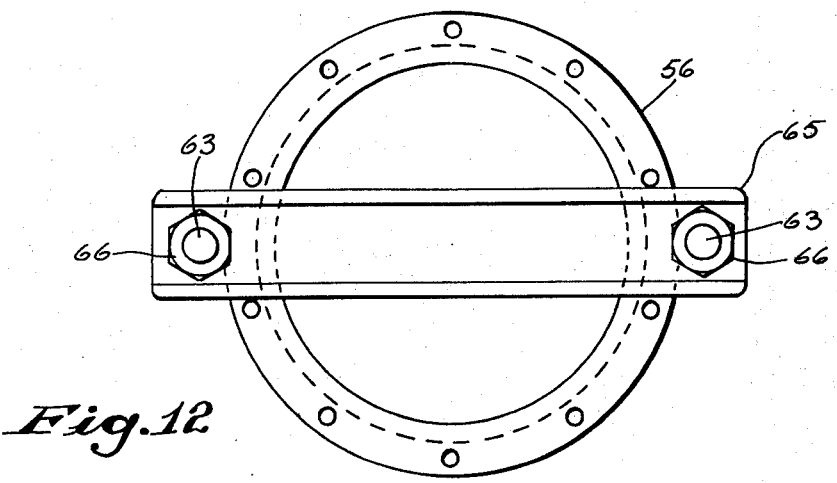
FIG. 12 is an end view of FIG. 11 looking from the right side.
Figure 13:
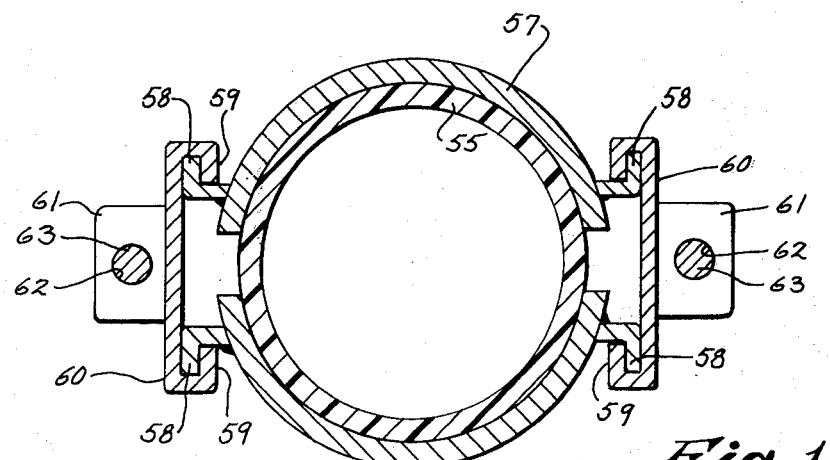
FIG. 13 is a section taken on line 13—13 of FIG. 11.

The last embodiment of the invention is illustrated in FIGS. 11 to 13 of the drawings. In this embodiment the wedge construction is employed to secure an end cap on a pipe end for test purposes or temporary closing.

Referring to FIGS. 11 to 13 there is illustrated a pipe 55 upon which a pipe member consisting of the end cap 56 is secured with cap 56 fitting over the end of pipe 55. The split gripper collar 57 with an inner gripper surface is assembled over the pipe 55 and has tapered rails 58 to receive flanges 59 of the oppositely disposed wedges 60. Each wedge 60 has an upstanding projection 61 having a hole 62 therein to receive a threaded rod 63 upon the free end of which is threaded the nut 64 in engagement with projection 61.

The other end of the respective rods 63 which are located diametrically opposite each other at each side of pipe 55 extend through the channel bar 65 which is anchored to the exposed or outer end of cap 56. The nuts 66 threaded onto the ends of rods 63 projecting through channel bar 65 upon tightening pull the wedges 60 toward end cap 56 with consequent forcing of end cap 56 into tight engagement with pipe 55.

In the operation of the apparatus of the invention it is important that the slide surfaces at the joint area of the parts be greased with an adhesive and be clean of grit, dirt and rust.

The gripping surface of the apparatus used engages the pipe over a large area and this prevents the pipe from collapsing, and this is aided by the flexible gripping surface employed in the split gripper collars. The primary purpose of the two cylinders is to provide a balanced force on each side of the pipe members to be joined and parallel to the axis of the pipe members so that the spigot of the one pipe member is socketed straight into the bell of the other pipe member rather than pulling at one side only which causes the spigot to cock and bind before it is completely mated with the bell surface. The same would be true with the use of the threaded rods to attach a cap to a pipe member.

The parts are readily assembled and disassembled and the gauge employed in the hydraulic system insures that the force applied will be controlled.

Various modes of carrying out the invention are contemplated as being within the scope of the following claims particularly pointing out and distinctly claiming the subject matter which is regarded as the invention.

I claim:

1. A pipe joint make up tool for securing two pipe members together at a joint, which comprises a split gripper collar assembled around the first pipe member and of a construction to provide an internal gripping surface in engagement with the first pipe member, said collar having rails along each facing edge which taper from a lesser height to a greater height in the direction towards the second pipe member, a wedge member disposed on opposite sides of the split gripper collar and having flanges on each side formed complementary to the rails on the split collar and received on said rails, power means connected to each wedge member, and a pulling member secured to each wedge member on opposite sides of the first pipe member and parallel to the axis of each pipe member to be joined and connected at the opposite end to the second pipe member, said power means being disposed to exert a selective balanced force on the wedge members and pull the latter along the rails on the collars to a greater wedging position thereby socketing the first pipe member and second pipe member together at the joint therebetween.

2. The pipe joint make up tool of claim 1 in which the power means in a hydraulic cylinder having a conduit to a source of power, and a pressure gauge disposed in said conduit to register the force being applied by each cylinder to join the pipe members together.

3. The pipe joint make up tool of claim 1 in which the power means are threaded rods secured to the wedge members on the one pipe member which extend through a bar at the other end in engagement with the exposed end of the other pipe member to receive nuts threaded thereon to pull the wedge members on the one pipe member toward the other pipe member as the nuts are threaded home to join the pipe members together.

4. The pipe joint make up tool of claim 2 in which the first pipe member is an elbow fitting to be secured to a second pipe member, an integral anchor secured to the outer curved surface of the elbow fitting, and the pulling member connected to the hydraulic cylinders on the second pipe member encircling the integral anchor and extending on diametrically opposite sides of the respective pipe members to upon actuation of the cylinders socket the second pipe member and elbow fitting together.

5. The pipe joint make up tool of claim 2 in which the first pipe member is an elbow fitting to which a second pipe member has already been joined to one end of the elbow fitting, a third pipe member assembled with the other end of the elbow fitting and disposed to be joined thereto, a split clamp secured over the second pipe member in abutting engagement with the end of the elbow fitting, a reusable anchor having an inner contour corresponding to that of the outer curvature of the elbow fitting and provided with a gripping surface in engagement with the elbow fitting, a pair of tie bars extending on opposite sides of the elbow with the tie bars being each secured respectively to the split clamp and to the anchor, an opening in the upper surface of the reusable anchor, and the pulling member connected to the hydraulic cylinders extending through the opening and around the reusable anchor and on opposite sides of the pipe and fitting to be joined to exert force on the anchor upon actuation of the hydraulic cylinders to through the anchor, tie bars and split clamp to socket the third pipe member into the end of the elbow fitting.

6. The pipe joint make up tool of claim 5 in which the elbow fitting is of 45°.

7. The pipe joint make up tool of claim 5 in which the elbow fitting is of 90°.

8. The pipe joint make up tool of claim 5 in which a nipple member is substituted for the third pipe member to initially socket the second pipe member into the end of the fitting.

9. The pipe joint make up tool of claim 1, and the connection of the pulling member to the second pipe member comprising a split gripper collar assembled around the second pipe member and of a construction corresponding to that of the split gripper collar assembled around the first pipe member with said collar having rails along each facing edge which taper from a lesser height to a greater height in the direction towards the first pipe member, and a wedge member disposed on opposite sides of the second named split gripper collar and having flanges on each side formed complementary to the rails on the second named split gripper collar, and the pulling member being connected to the wedge members on the opposite sides of the second pipe member.

* * * * *

UNITED STATES PATENT AND TRADEMARK OFFICE
CERTIFICATE OF CORRECTION

PATENT NO. : 3,978,572
DATED : September 7, 1976
INVENTOR(S) : ROBERT M. JACKMAN It is certified that error appears in the above—identified patent and that said Letters Patent are hereby corrected as shown below:

Column 5, line 41, Cancel "is" and substitute therefor ---in---;

Column 5, line 57, Cancel "36" and substitute therefor ---35---;

Column 7, line 24, CLAIM 2 Cancel "in" and substitute therefor ---is---.

Signed and Sealed this

Fifteenth Day of March 1977

[SEAL]

Attest:

RUTH C. MASON
Attesting Officer

C. MARSHALL DANN
Commissioner of Patents and Trademarks